United States Patent
Amiot et al.

(10) Patent No.: US 11,068,019 B2
(45) Date of Patent: Jul. 20, 2021

(54) METHOD OF CALIBRATING A CLOCK OF A CHIP CARD CIRCUIT, AND ASSOCIATED SYSTEM

(71) Applicant: IDEMIA FRANCE, Courbevoie (FR)

(72) Inventors: Lucien Amiot, Courbevoie (FR); Bastien Duong, Courbevoie (FR)

(73) Assignee: IDEMIA FRANCE, Courbevoie (FR)

(*) Notice: Subject to any disclaimer, the term of this patent is extended or adjusted under 35 U.S.C. 154(b) by 111 days.

(21) Appl. No.: 16/307,808

(22) PCT Filed: Jun. 6, 2017

(86) PCT No.: PCT/FR2017/051415
§ 371 (c)(1),
(2) Date: Dec. 6, 2018

(87) PCT Pub. No.: WO2017/212157
PCT Pub. Date: Dec. 14, 2017

(65) Prior Publication Data
US 2019/0310682 A1    Oct. 10, 2019

(30) Foreign Application Priority Data
Jun. 8, 2016   (FR) ........................ 1655254

(51) Int. Cl.
*G06F 1/04*    (2006.01)
*G06F 1/14*    (2006.01)
(Continued)

(52) U.S. Cl.
CPC .................. *G06F 1/12* (2013.01); *G06F 1/04* (2013.01); *G06K 7/0013* (2013.01); *G06K 7/016* (2013.01)

(58) Field of Classification Search
CPC ........... G06F 1/12; G06F 1/04; G06K 7/0013; G06K 7/016
See application file for complete search history.

(56) References Cited

U.S. PATENT DOCUMENTS 5,422,953 A     6/1995 Fischer
2006/0158268 A1  7/2006 McCorquodale et al.
(Continued)

FOREIGN PATENT DOCUMENTS

EP    0770953 A2    5/1997
EP    1772794 A1    4/2007

OTHER PUBLICATIONS

International Search Report dated Oct. 2, 2017, International Application No. PCT/FR2017/051415, 2 pages.

*Primary Examiner* — Xuxing Chen
(74) *Attorney, Agent, or Firm* — MH2 Technology Law Group LLP (57) ABSTRACT

A calibration method for calibrating a clock of a circuit for a smart card, which includes operations for: at a first instant, storing (S310) first time data from a terminal in the clock; at a second instant, reading (S320) second time data from the clock and corresponding to the first time data incremented by the clock as a function of a first duration between the first instant and the second instant; comparing (S330) the second time data with third time data corresponding to the first time data incremented, by the terminal or by a remote server, as a function of the first duration between the first instant and the second instant; as a function of the result of the comparison, calculating (S340) first calibration data; and storing (S350) the first calibration data in the clock. The reading of the second time data may be in a contactless manner.

22 Claims, 3 Drawing Sheets

(51) Int. Cl.
　　　*G06F 1/12*　　　　(2006.01)
　　　*G06K 7/00*　　　　(2006.01)
　　　*G06K 7/016*　　　(2006.01)

(56) References Cited

U.S. PATENT DOCUMENTS

2008/0231328 A1　　9/2008　Leydier et al.
2012/0084594 A1　　4/2012　Chen et al.
2017/0168520 A1*　6/2017　Yu .............................. G06F 1/14

* cited by examiner

METHOD OF CALIBRATING A CLOCK OF A CHIP CARD CIRCUIT, AND ASSOCIATED SYSTEM

CROSS-REFERENCE TO RELATED APPLICATIONS

This application is a U.S. National Stage application of International Application No. PCT/FR2017/051415 filed 6 Jun. 2017, which claims priority to French Application No. 1655254 filed 8 Jun. 2016, the entire disclosures of which are hereby incorporated by reference in their entireties.

BACKGROUND OF THE INVENTION

The present invention relates to the field of clocks for smart card circuits, and it relates more particularly to a method of calibrating a clock of a smart card circuit.

The invention applies particularly, but in non-exclusive manner, to bank cards of ID-1 format as specified in the ISO/IEC 7810 standard, presenting dimensions of 85.6 millimeters (mm) by 53.98 mm by 0.76 mm.

The invention can also be applied to smart cards having contacts of characteristics as set out in detail in the ISO/IEC 7816 standard, and it can also be applied to contactless smart cards having characteristics that are set out in detail in the ISO/IEC 14443 standard.

In known manner, certain smart cards include a clock that enables operations to be performed as a function of time, e.g. operations of generating and displaying a dynamic verification code, known as a "motion code", for use in making on-line bank payments secure. During an on-line payment, the user of such a smart card enters the primary account number (PAN) of the card, the expiry date of the card, the name of the bearer of the card, and also a dynamic verification code as displayed by the card, with a new dynamic verification code being generated and displayed several times a day.

The operations of generating and displaying a dynamic verification code require a clock that is very accurate. For example, in order to perform the operation of generating a dynamic verification code, the card needs to be synchronized in time with a server that is adapted to verify the code. If the clock in the card is not accurate, then the card can lose synchronization with the server, which can give rise to an error and stop the bank payment.

The clock is therefore calibrated during fabrication of the smart card. A known calibration method comprises a step of measuring the resonant frequency of the oscillator of the clock by means of a measuring instrument having contacts, e.g. a probe.

The measurement is taken over a short duration, of the order of a dozen seconds, by positioning the contacts of the probe on the contacts of the clock. After processing the measurement, calibration data is stored in the clock.

Since the duration of the measurement is very short, that calibration method cannot take account of external factors present in the surroundings in which the card is stored, such as temperature, noise, absence or presence of ultraviolet radiation, the battery of the card, etc., with the surroundings of the card potentially changing during transport of the card.

Furthermore, the measurement can vary as a function of the measuring instrument that is used, since measuring instruments are not all calibrated in the same manner.

The calibration established on the basis of the measurement is thus not very accurate.

In addition, taking the measurement requires the presence of contact pads on the circuit of the clock, the presence of an operator, and also maintenance of the measuring instrument. The cost and duration required for producing the smart card are thus large.

There therefore exists a need for a solution that enables calibration to be more accurate, and the duration and the cost of producing the smart card to be reduced.

OBJECT AND SUMMARY OF THE INVENTION

To this end, the present invention provides a calibration method for calibrating a clock of a circuit for a smart card, the method comprising the following steps:

at a first instant, storing first time data from a terminal in the clock by means of a communications channel between the terminal and the circuit including the clock;

at a second instant, reading second time data from the clock and corresponding to the first time data incremented by the clock as a function of a first duration between the first instant and the second instant;

comparing the second time data with third time data corresponding to the first time data incremented, by the terminal or by a remote server, as a function of the first duration between the first instant and the second instant;

as a function of the result of the comparison, calculating first calibration data; and storing the first calibration data in the clock by means of the communications channel;

the method being characterized in that the second time data is read in contactless manner by means of the communications channel.

Since the second time data is read in contactless manner, the method does not use a measuring instrument with contacts. This improves the accuracy of calibration. Furthermore, the cost and the duration of producing the smart card are reduced.

The method of the invention does not use a temperature sensor, since such a sensor is not suitable for calibrating smart card clocks. Specifically, in order to be used for calibrating a clock, a temperature sensor would need to be embedded in the resin. Unfortunately, the resin can alter the measurements of the sensor, thereby making the measurement of the sensor unusable. In addition, fabricating a smart card can require the card body to be laminated while hot, which can take a temperature sensor out of adjustment.

In a particular implementation, the first duration between the first instant and the second instant is greater than or equal to three days.

This first duration thus makes it possible to take account of external factors present in the storage surroundings of the card, e.g. temperature, noise, absence or presence of ultraviolet radiation, the card battery, etc., it being possible for the storage environment also to change while the card is being transported.

In a particular implementation, the first time data corresponds to the current date and time of the terminal at the first instant.

In a particular implementation, the clock comprises an oscillator and a treatment circuit including time registers and at least one calibration register, such that at least a portion of the first time data is stored in the time register and the first calibration data is stored in at least one calibration register.

In a particular implementation, the oscillator is a low frequency crystal oscillator.

In a particular implementation, the method further comprises a step of zeroing the calibration register before the first instant or at the first instant.

In a particular implementation, storing the first time data and storing the first calibration data comprises contactless writing.

In a particular implementation, the step of comparing the second time data with third time data comprises a substep of subtracting the third time data from the second time data and a substep of dividing the result of the subtraction by the first duration between the first instant and the second instant.

In a particular implementation, the step of calculating first calibration data comprises:
  a substep of calculating the drift of the clock in hertz;
  a substep of calculating the real resonant frequency of the clock as a function of the drift of the clock in hertz and as a function of the resonant frequency of the clock; and
  a substep of obtaining the first calibration data as a function of the real resonant frequency.

In a particular implementation, the method further comprises a step of storing, in the clock, fourth time data obtained by the terminal at a third instant corresponding to the first time data incremented as a function of a second duration between the first instant and the third instant.

In a particular implementation, the method further comprises a step of creating a communications channel between the terminal and the circuit including the clock.

In a particular implementation, access to the communications channel requires access authentication.

In a particular implementation, the access authentication is performed by means of a password.

In a particular implementation, the access authentication is performed by means of public keys or private keys.

In a particular implementation, the steps of reading second time data, of comparing the second time data with third time data, of calculating first calibration data, and of storing the first calibration data are reiterated.

Reiterating at least some of the steps of the method serves to improve the accuracy of the calibration. Specifically and by way of example, this makes it possible to take account of a change of temperature occurring after storing fourth time data, e.g. as a result of the smart card being transported from the site where the smart card is fabricated to the site where the smart card is used.

In a particular implementation, the method further comprises a step of blocking communication between the circuit including the clock and terminals external to the smart card.

This serves to improve the security of the smart card.

In a particular implementation, the step of storing the first time data is performed during a pre-personalization stage while fabricating the smart card.

In a particular implementation, the step of reading the second time data, the step of comparing the second time data with the third time data, the step of calculating first calibration data, and the step of storing the first calibration data are performed during a personalization stage while fabricating the smart card.

In a particular implementation, the step of storing fourth time data in the clock is performed during a personalization stage while fabricating the smart card.

In a particular implementation, the method is applied to the circuit including a clock, the smart card further including a module, the circuit including a clock being separate from and independent of the module.

The invention also provides a calibration system adapted to perform a method of calibrating a clock of a circuit for a smart card as described above.

In a particular embodiment, the various steps of the calibration method are determined by computer program instructions.

Consequently, the invention also provides a computer program on a data medium (or storage medium), the program being suitable for being performed by a terminal of a calibration system or more generally in a computer, the program including instructions adapted to perform steps of a calibration method as defined above.

The program may use any programming language, and be in the form of source code, object code, or code intermediate between source code and object code, such as in a partially compiled form, or in any other desirable form.

The invention also provides a data medium (or storage medium) that is readable by a terminal of a calibration system or more generally by a computer, and that includes instructions of a computer program as mentioned above.

The data medium may be any entity or device capable of storing the program. For example, the medium may include storage means, such as a rewritable non-volatile memory (e.g. of the electrically erasable programmable read only memory (EEPROM) type or of the flash NAND type), or such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF IMPLEMENTATIONS

The present invention relates to the field of smart card circuit clocks, and it relates more particularly to a method of calibrating a smart card circuit clock.

The invention applies particularly, but not exclusively, to bank cards of the ID-1 format specified in the ISO/IEC 7810 standard, presenting dimensions of 85.6 mm by 53.98 mm by 0.76 mm.

The invention may also be applied to smart cards having contacts of characteristics set out in detail in the ISO/IEC 7816 standard, and can also apply to smart cards without contacts having characteristics as set out in detail in the ISO/IEC 14443 standard.

The term "clock" is used to mean an electronic circuit that continuously issues periodic pulses enabling a system to measure time accurately.

Figure 1:
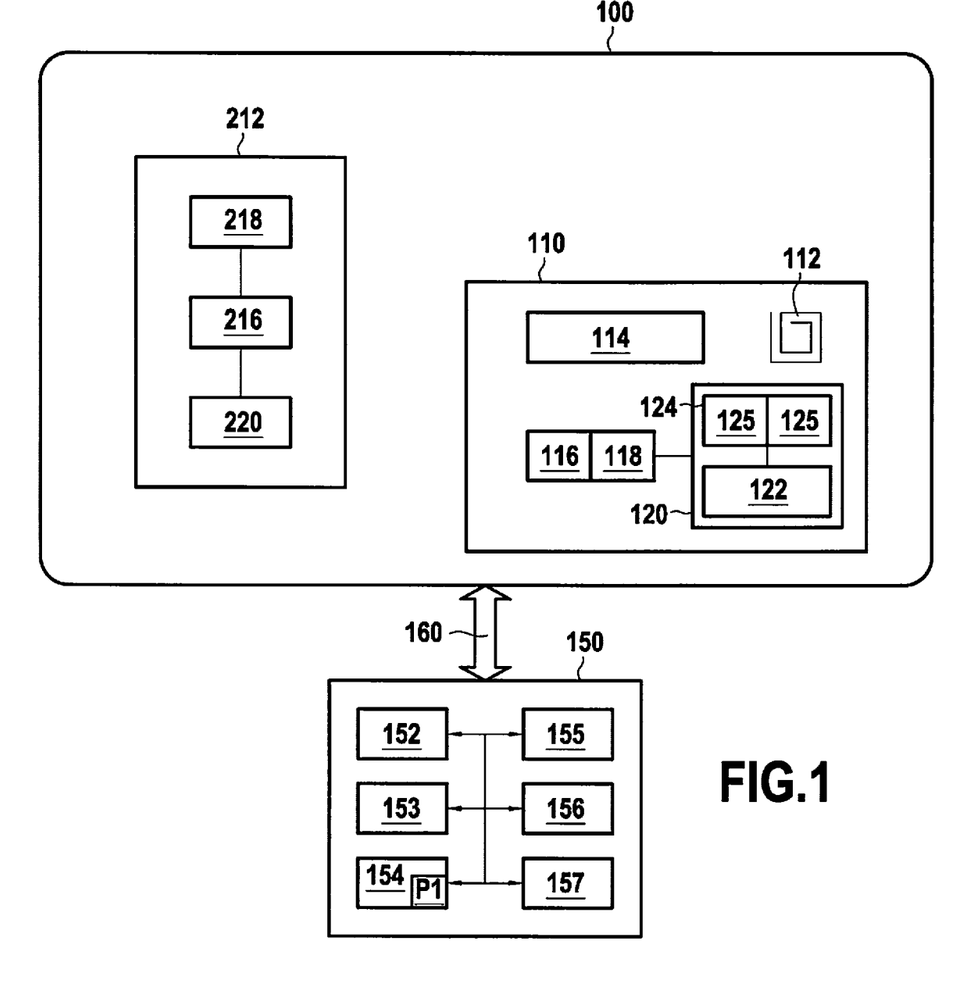
FIG. 1 is a block diagram of a calibration system in accordance with an embodiment of the invention.

FIG. 1 is a block diagram of a calibration system in accordance with an embodiment of the invention and suitable for performing a calibration method in accordance with an implementation, e.g. the method described with reference to FIG. 3 or the method described with reference to FIG. 5.

The system comprises a smart card 100 and a terminal 150.

The smart card 100 includes a circuit 110 including a clock 120 that can be calibrated by a calibration method in accordance with an implementation of the invention. The circuit 110 also includes a microprocessor 116, a memory 118, and a wireless communications antenna 112, and it may include a battery 114.

The clock 120 includes an oscillator 122 and a processor circuit 124 for processing the signal issued by the oscillator, the processor circuit 124 having registers 125. The processor circuit 124 is configured to count time.

In an example, the circuit 110 is a flexible electronic circuit, e.g. adapted to generate and display a dynamic verification code of the card, also known as a "motion code", for use in securing on-line bank payments. In this example, the circuit 110 includes a screen suitable for displaying a dynamic verification code.

In an example, the clock is a real time clock (RTC) capable of using the coordinated universal time (UTC) scale.

Furthermore, the oscillator 122 may be a low frequency crystal oscillator, e.g. resonant at a resonant frequency fr of about 32 kilohertz (kHz).

By way of example, the registers 125 comprise calendar or time registers, at least one calibration register, and may include RTC configuration registers (e.g. error detection registers, read and write registers, or alarm type registers). In an example, the processor circuit 124 includes at least one register selected from a first time register adapted to count seconds, a second time register adapted to count minutes, a third time register adapted to count hours, a fourth time register adapted to count days, a fifth time register adapted to count months, and a sixth time register adapted to count years.

The smart card 100 may also include a circuit or module that is separate from and independent of the circuit 110, such as the module 212 described with reference to FIG. 2.

By way of example, the terminal 150 is a personalization terminal, used for personalizing the smart card in software manner during fabrication of the smart card.

The terminal 150 presents the conventional architecture of a computer. The terminal 150 comprises in particular a processor 152, an operating system 153, a ROM 154, a rewritable non-volatile memory 155 (e.g. of the EEPROM or flash NAND type), a rewritable volatile memory or "random access" memory (RAM) 156, and a communications interface 157.

In this example, the ROM 154 constitutes a data (or recording) medium in accordance with a particular embodiment of the invention. The ROM 154 stores a computer program P1 enabling the terminal 150 to perform a calibration method in accordance with an implementation of the invention. In a variant, the computer program P1 is stored in the rewritable non-volatile memory 155.

A communications channel 160 may exist between the smart card 100 and the terminal 150, more precisely between the circuit 110 including the clock 120 and the communications interface 157 of the terminal 150.

The system may also include a server (not shown) that is remote from the terminal 150. The server presents the conventional architecture of a computer, and in particular it comprises a processor, an operating system, a ROM, a rewritable non-volatile memory (e.g. of the EEPROM or the flash NAND type), a RAM, and a communications interface, suitable for communicating with the communications interface 157 of the terminal 150.

Figure 2:
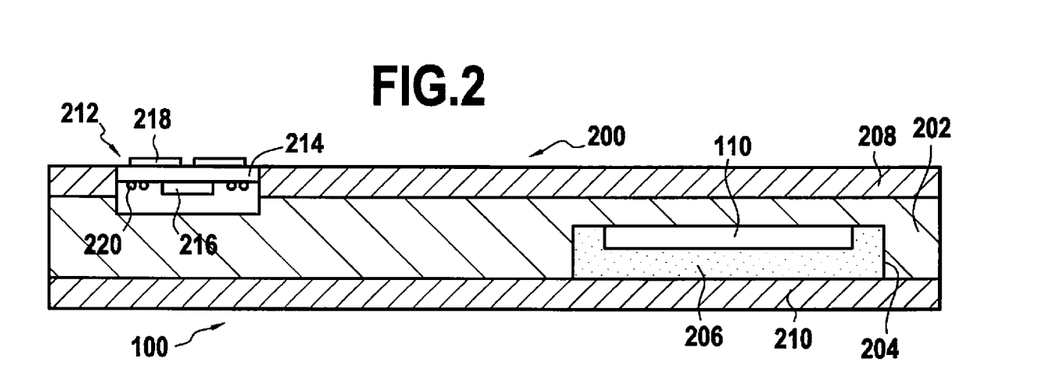
FIG. 2 is a diagrammatic section view of a smart card of the FIG. 1 calibration system.

FIG. 2 is a diagrammatic section view of the smart card 100 of the FIG. 1 calibration system. The smart card 100 comprises a card body 200 having a first layer 202 that is capable of including a cavity 204. The circuit 110 is then positioned in the cavity 204 and is secured by means of resin 206. The card body 200 may also include at least one other layer, e.g. a second layer 208 and a third layer 210, the first layer 202 being positioned by way of example between the second layer 208 and the third layer 210. In a variant, the card body 200 comprises the first layer 202 only.

The smart card 100 may include a module 212 that is separate from and independent of the circuit 110. In an example, the module 212 comprises a substrate 214 and an electronic chip 216 fastened on the substrate 214. The electronic chip 216 is adapted to carry out a bank payment using the European Mastercard Visa (EMV) standard. The electronic chip 216 thus performs applications enabling bank transactions to be carried out.

The module 212 may include external contacts 218 adapted to carry out a payment with contact, and/or an antenna 220, adapted to carry out a payment contactlessly. In a variant, the smart card 100 does not include a module 212.

Figure 3:
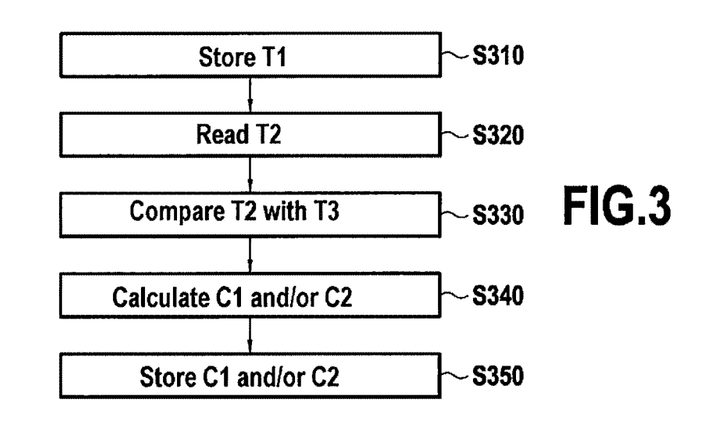
FIG. 3 is a flow chart showing the main steps of a calibration method in accordance with an implementation of the invention.

FIG. 3 shows a method of calibrating a clock of a smart card circuit in accordance with an implementation of the invention. In the description below of FIG. 3, it is assumed that the calibration method is performed by the calibration system of FIG. 1, and thus that the clock for calibrating is the clock 120 of the smart card 100 of the FIG. 1 calibration system 100. Nevertheless, the method can be performed by any calibration system including at least one terminal and a smart card.

At a first instant t1, first time data T1 of the terminal 150 is stored in the clock 120 (step S310) by means of a communications channel 160 between the terminal 150 and the circuit 110 including the clock 120.

Figure 4:
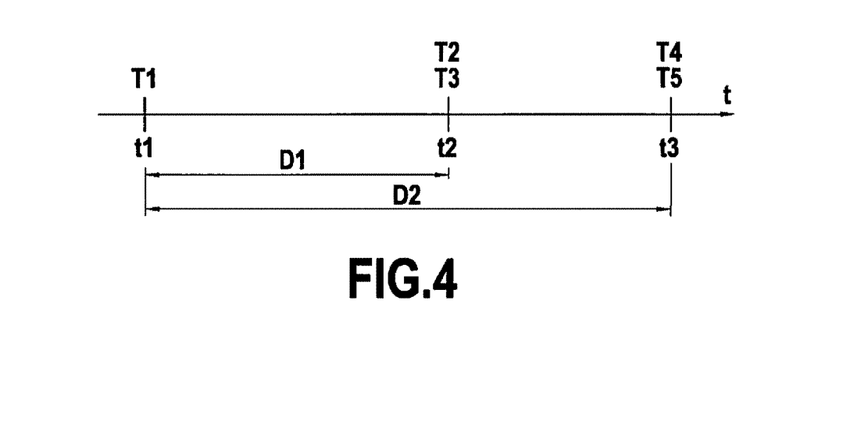
FIG. 4 is a timing chart showing various instants at which certain steps of a calibration method in accordance with an implementation of the invention are performed.

At a second instant t2, in a step S320, second time data T2 of the clock 120 is read. The second time data T2 of the clock 120 corresponds to the first time data T1 as incremented by the clock 120 as a function of a first duration D1 between the first instant t1 and the second instant t2 (see FIG. 4). The second time data T2 is read contactlessly, specifically by means of the communications channel 160.

In a step S330, the second time data T2 is compared with third time data T3. The third time data T3 corresponds to the first time data T1 incremented as a function of the first duration D1 between the first instant t1 and the second instant t2, by the terminal 150 or by the remote server.

In a step S340, first calibration data C1 is calculated as a function of the result of the comparison in step S330.

In a step S350, the first calibration data C1 is stored in the clock 120 by means of the communications channel 160.

Since the second time data T2 is read contactlessly, the method does not make use of measuring instruments with contacts. This improves the accuracy of the calibration. In addition, the cost and the duration of producing the smart card are reduced.

The method of the invention does not use a temperature sensor, since that is not adapted to calibrating smart card clocks. Specifically, in order to be used for calibrating a clock, a temperature sensor needs to be embedded in the resin. However, resin can alter the measurements of the sensor, thereby making the measurements of the sensor unusable. In addition, fabricating a smart card may require the card body to be subjected to lamination while hot, and that can take a temperature sensor out of adjustment.

Figure 5:
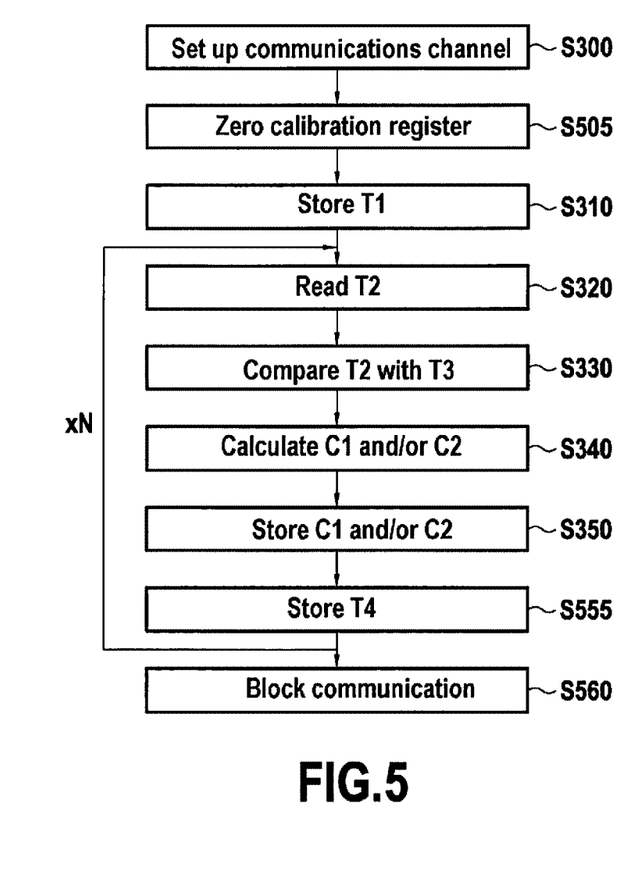
FIG. 5 is a flow chart showing the main steps of a calibration method in accordance with an implementation of the invention.

FIG. 5 shows a method of calibrating a clock of a smart card circuit in accordance with an implementation of the invention.

In the description below of FIG. 5, it is assumed that the calibration method is performed by the FIG. 1 calibration system, and thus that the clock that is to be calibrated is the clock 120 of the smart card 100 of the FIG. 1 calibration system. Nevertheless, the method may be performed by any calibration system including at least one terminal and a smart card.

In a step S300, a communications channel 160 may be set up between the terminal 150 and the circuit 110 including the clock 120.

In a variant, the communications channel 160 already exists.

The communications channel 160 may be made secure. Thus, in an example, access to the communications channel 160 may require authentication. The circuit 110 and the terminal 150 thus need to be authenticated prior to being able to communicate via the communications channel 160. Typically, the number of attempts at authentication is limited.

In an example, authentication is performed by means of a password that is specific for each smart card 100. The communications channel 160 is thus made secure by means of a password.

The password is input by the operator of the terminal 150 and it is formatted as bytes. The format of the password is defined when creating the operating system of the circuit 110 and it may be generated in random manner.

In another example, authentication is performed by cryptographic means, typically private keys or public keys. The communications channel 160 is made secure by mutual authentication between the terminal 150 and the circuit 110, using private keys or public keys. Type length value (TLV) coding may be used in application of the ISO/IEC 15693 protocol and by means of a pair of keys, e.g. of 3DES, Hash1,2,3, AEA, RSA, or MD5 type.

The method may also include a step S505 of zeroing the calibration register before the first instant t1 or at the first instant t1.

During this zeroing step S505, the value "0" is written into each calibration register of the clock 120.

At the first instant t1, first time data T1 of the terminal 150 is stored in the clock 120 (step S310) by means of the communications channel 160. The terminal 150 thus stores the first time data T1 in the clock 120 via the communications channel 160. In an example, the first time data T1 is stored in the time registers 125 of the clock 120. The first time data T1 may be stored by the terminal 150 in the clock 120 by contactless writing, in particular carried out by means of the antenna 112 of the circuit 110.

In an example, the first time data T1 corresponds to the current date and time of the terminal 150, as given by the clock of the terminal 150 at the instant t1. After the storage step 310, the first time data T1 is incremented by the clock 120.

At a second instant t2, in a step S320, second time data T2 of the clock 120 is read. The second time data T2 of the clock 120 corresponds to the first time data T1 incremented by the clock 120 as a function of a first duration D1 between the first instant t1 and the second instant t2 (see FIG. 4). More precisely, the second time data T2 of the clock 120 corresponds to the first time data T1 incremented by the clock 120 as a function of the resonant frequency of the oscillator 122 of the clock 120 during the first duration D1. The second instant t2 is after the first instant t1. The second time data T2 is read contactlessly, in particular by means of the antenna 112 of the circuit 110. The second time data T2 is read by means of the communications channel 160, with the terminal 150 reading the second time data T2 via the communications channel 160.

In an example, the first duration D1 between the first instant t1 and the second instant t2 is greater than or equal to three days. This first duration D1 thus makes it possible to take account of external factors present in the storage surroundings of the smart card 100, e.g. temperature, noise, absence or presence of ultraviolet radiation, card battery, etc., it also being possible that for the storage surroundings to change during transport of the card.

In a step S330, the second time data T2 is compared with third time data T3. The third time data T3 corresponds to the first time data T1 incremented as a function of the first duration D1 between the first instant t1 and the second instant t2 by the terminal 150 or by the remote server.

More precisely, the third time data T3 may correspond to the first time data T1 incremented during the first duration D1 by the terminal 150, e.g. as a function of the resonant frequency of the oscillator of the clock of the terminal 150, and possibly as a function of one or more items of calibration data for the clock of the terminal 150.

In another example, the third time data T3 corresponds to the first time data transmitted by the terminal 150 to the remote server, and then incremented by the remote server as a function of the first duration D1 between the first instant t1 and the second instant t2.

The comparison step S330 may include a substep of subtracting the third time data T3 from the second time data T2, and a substep of dividing the result of the subtraction by the first duration D1 between the first instant t1 and the second instant t2. The result of the comparison step S330, referred to as the drift d of the clock 120, can thus be calculated using the following formula:

$$d = \frac{T2 - T3}{D1}$$

In a step S340, first calibration data C1 is calculated as a function of the result of the comparison in step S330. Second calibration data C2 may also be calculated in step S340.

The calculation step S340 may include a substep of calculating the daily drift dd of the clock 120 from the drift d of the clock 120. In an example, D1 is a number of days and the daily drift dd is equal to the drift d of the clock 120.

Thereafter, the calculation step S340 may include a substep of calculating the drift in hertz dHz, as a function of the daily drift dd and of the resonant frequency fr of the clock 120. The drift in hertz dHz may be calculated using the following formula:

$$dHz = \frac{dd}{60 \times 60 \times 24} \times fr$$

where dHz and fr are in hertz and dd is in seconds per day.

The calculation step S340 may then include a substep of calculating the real resonant frequency frr as a function of the drift in hertz dHz and of the resonant frequency fr. The real resonant frequency frr may be calculated using the following formula:

$$frr = dHz + fr$$

where frr, dHz, and fr are in hertz.

In an example, the resonant frequency fr of the clock 120 is equal to 32768 hertz (Hz) and the daily drift dd of the clock is equal to 23.3 seconds per day. The drift in hertz dHz is then equal to 8.83674 Hz, and the real resonant frequency frr is equal to 32776.83674 Hz.

The calculation step S340 may then include an obtaining substep for obtaining the first calibration data C1 as a function of the real resonant frequency frr, typically by means of tables, which may be supplied by the manufacturer of the clock. The second calibration data C2 may also be obtained as a function of the real resonant frequency, typically by means of tables.

When the first time data T1 is incremented by the terminal 150 in order to obtain the third time data T3, the comparison step S330 and the calculation step S340 are performed by the terminal 150.

In a variant, when the first time data T1 is incremented by the remote server in order to obtain the third time data T3, the subtraction substep in the comparison step S330 and the calculation step S340 are performed by the remote server. In this variant, the remote server then transmits the first calibration data C1 to the terminal 150.

In a step S350, the first calibration data C1 is stored in the clock 120 via the communications channel 160. In an example, the calibration data C1 is stored in the calibration register 125 of the clock 120. The first calibration data C1 may be stored by contactless writing. The second calibration data C2 may also be stored in the clock 120 in step S350. The clock 120 is then calibrated.

The method may also include a storage step S555 in which fourth time data T4 obtained by the terminal 150 at a third instant t3 is stored in the clock 120 via the communications channel 160. The fourth time data T4 corresponds to the first time data T1 incremented as a function of a second duration D2 between the first instant t1 and the third instant t3. The third instant t3 is after the second instant t2, while the second instant t2 is after the first instant t1 (see FIG. 4).

The fourth time data T4 may correspond to the first time data T1 incremented during the second duration D2 by the terminal 150 as a function of the resonant frequency of the oscillator of the clock of the terminal 150, and possibly as a function of one or more items of calibration data for the clock of the terminal 150

In another example, the fourth time data T4 corresponds to the first time data incremented by the remote server as a function of the second duration D2 between the first instant t1 and the third instant t3.

The fourth time data T4 stored in the time registers 125 of the clock 120 replaces fifth time data T5 corresponding to the first time data T1 incremented by the clock 120 as a function of the second duration D2 between the first instant t1 and the third instant t3. More precisely, the fifth time data T5 corresponds to the first time data T1 incremented during the second duration D2 by the clock 120 as a function of the resonant frequency fr of the oscillator 122 of the clock 120. Replacing the fifth time data T5 by the fourth time data T4 may consist in updating the time registers 125 in part. For example, it is possible to update only that one of the time registers 125 that is adapted for counting seconds.

The fifth time data T5, which is not accurate since the clock 120 is not calibrated before step S350, is thus deleted from the clock 120.

The fourth time data T4 is then incremented by the clock 120 as a function of the resonant frequency fr of the oscillator 122 of the clock 120, as a function of the first calibration data C1, and possibly as a function of the second calibration data C2. The fourth time data T4 is thus incremented accurately.

More precisely, since the signal issued by the oscillator 122 is divided into calibration periods, the first calibration data C1, and possibly also the second calibration data C2, enable(s) the clock 120 to add or subtract pulses from the oscillator 122 for each calibration period. In an example, the calibration period is equal to 16 seconds or to 32 seconds. The clock 120 is thus calibrated accurately at each calibration period.

Figure 6:
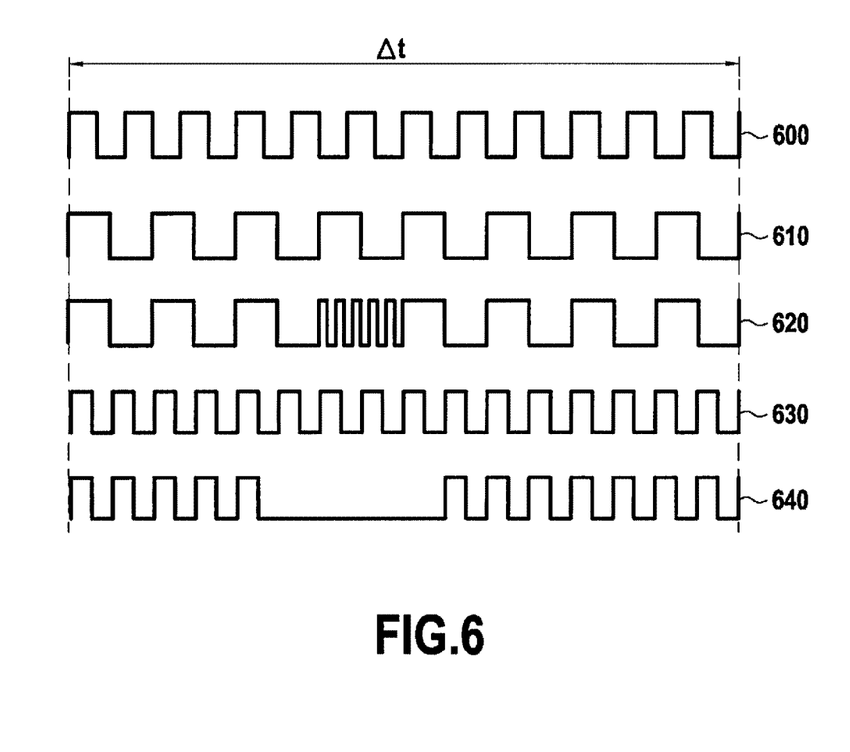
FIG. 6 is a chart showing both clock oscillator signals and clock oscillator signals after calibration in a calibration method in accordance with an implementation of the invention.

FIG. 6 shows an example of calibrating the clock signal 120. The signal 600 shows a theoretical oscillator signal at a nominal resonant frequency.

The signal 610 shows a first oscillator signal that needs to be calibrated, the resonant frequency of the oscillator being lower than the nominal frequency. The signal 620 shows the first oscillator signal after it has been calibrated. Pulses have been added to the first oscillator signal 610 in order to obtain the same number of pulses as in the theoretical oscillator signal 600 over the calibration period □t.

The signal 630 shows a second oscillator signal that needs to be calibrated, the resonant frequency of the oscillator being higher than the nominal frequency. The signal 640 shows the second oscillator signal after it has been calibrated. Pulses have been removed from the second oscillator signal 630 so as to obtain the same number of pulses as the theoretical oscillator signal 600 during the calibration period □t.

In an example, the steps S505, S310, S320, S350, and S555 of contactless reading or writing (or storage) of data in the clock 120 by the terminal 150 comprise transmitting a read or write request by means of an antenna of the communications interface 157 of the terminal 150 and by means of the antenna 112 of the circuit 110 including the clock 120 via the communications channel 160. The energy received by the antenna 112 of the circuit 110 activates the microprocessor 116. The microprocessor 116 analyses the request and then reads or writes the data as deduced from the request in the registers 125 of the clock 120. The read or write steps S505, S310, S320, S350, and S555 are thus performed by the terminal 150 and the smart card 100.

The presence of the communications channel 160 can enable the steps S505, S310, S320, S350, and S555 of contactless reading or writing (or storage) of data in the clock 120 by the terminal 150 to be performed in secure manner, e.g. using the ISO/IEC 15693 standard.

In an example, the terminal 150 is authenticated prior to being able to communicate via the communications channel 160. Thereafter, each read or write request sent by the terminal 150, and each response of the smart card 100 may be encrypted, typically by means of a pair of keys.

The steps S505, S310, S320, S350, and S555 of contactless reading or writing (or storage) may be performed using TLV encoding.

In an example, communication via the communications channel 160 between the terminal 150 and the circuit 110 including the clock 120, and thus the reading or writing steps S505, S310, S320, S350, and S555 are carried out after authentication by means of a password. Typically, the number of attempts at authentication is limited. In addition, the steps S505, S310, S320, S350, and S555 are carried out using TLV encoding, using the ISO/IEC 15693 standard and in a manner that is encrypted, typically by means of a pair of keys.

The data exchanged between the microprocessor 116 and the processor circuit 124 may be encrypted.

After the step S555 of storing fourth time data T4, the method may also include a step S560 of blocking communication between the circuit 110 including the clock 120 and terminals external to the smart card 100.

In an example, the blocking step S560 includes a substep of changing the state of a switch, such as a transistor, located between two turns of the antenna 112 of the clock, in one turn of the antenna 112, or located between a turn and the ground of the circuit. When the transistor is located between two turns of the antenna 112, the switch goes from the open state to the closed state, thereby short-circuiting the antenna 112, and thus preventing the circuit 110 from communicating in contactless mode. When the transistor is located in a turn of the antenna 112, the switch passes from the closed state to the open state, thereby subdividing the antenna 112 into two portions that are not electrically connected together, and thus preventing the circuit 110 from communicating. When the transistor is located between a turn of the antenna 112 and ground, the switch goes from the open state to the closed state, thereby connecting the antenna 112 to ground, and thus preventing the circuit 110 from communicating in contactless mode.

In another example, the blocking step S560 includes a substep of modifying the state of a flag of the circuit 110, where modifying its state has the effect of no longer taking account of read or write requests coming from an external terminal. Thus, when the clock 120 receives such a read or write request, in spite of receiving the request, the clock 120 does not read or write in the registers 125 of the clock 120. The change in the state of a flag of the circuit 110 is not reversible. It is then no longer possible to read or write in the registers 125 of the clock 120. The security of the smart card 100 is thus improved. In this example, access to the communications channel 160 can still be made secure, by means of a password or by means of encryption keys. Nevertheless, the circuit 110 no longer responds to requests to read or write coming from an external terminal.

Since reading of the second time data T2 is contactless reading, the method does not use measuring instruments with contacts. This improves the accuracy of calibration. Furthermore, the cost and the duration of producing the smart card are reduced.

The method of the invention does not use a temperature sensor, since such a sensor is not adapted to calibrating smart card clocks. Specifically, in order to be used for calibrating a clock, a temperature sensor needs to be embedded in the resin. However, resin can alter the measurements of the sensor, thereby making the measurements of the sensor unusable. In addition, fabricating a smart card can require the card body to be subjected to rolling while hot, and that can take a temperature sensor out of adjustment.

In an example, the steps S320, S330, S340, S350, and S355 are reiterated N times, where N is a positive integer. The steps may be reiterated before the blocking step S560. The steps may also be reiterated after the blocking step S560, except in the event of the blocking step S560 including a substep of modifying the state of the a flag of the circuit 110.

Reiterating at least some of the steps of the method serves to improve the accuracy of calibration. Specifically, this makes it possible for example to take account of a temperature change occurring after an iteration of the step S555 of storing fourth time data T4, e.g. as a result of the smart card 100 being transported from the site on which the smart card 100 is fabricated to the site where the smart card 100 is to be used.

Figure 7:
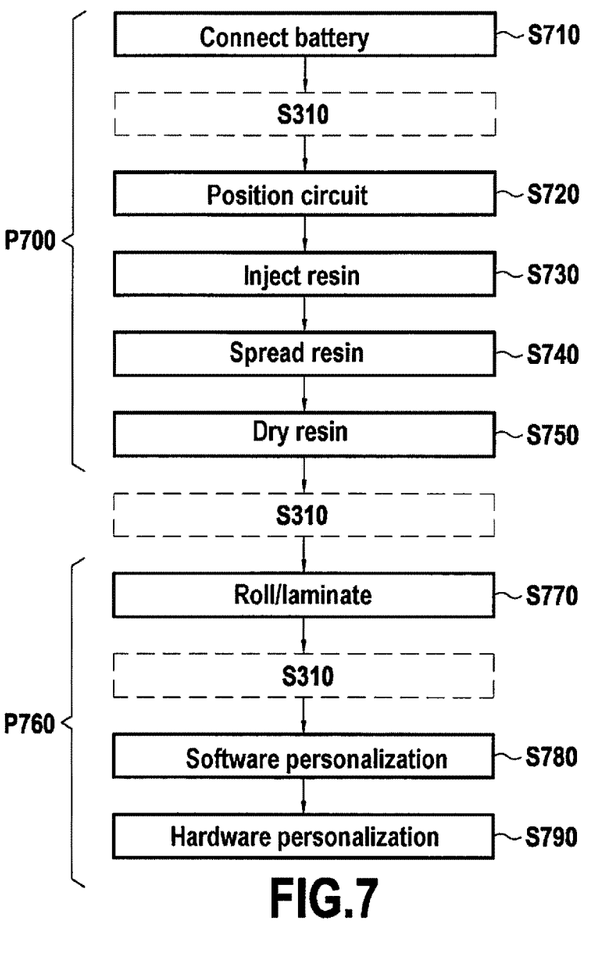
FIG. 7 is a flow chart showing the main steps of a method of fabricating a smart card and including a calibration method performed in accordance with an implementation of the invention.

FIG. 7 shows a method of fabricating a smart card that includes a method of calibrating a clock of a smart card circuit in accordance with an implementation of the invention.

In the description below of FIG. 7, it is assumed that the smart card that has been fabricated is the smart card 100 of FIG. 2. Nevertheless, the smart card could be any smart card including a circuit having a clock with an oscillator and a processor circuit.

The fabrication method includes a pre-personalization stage P700. The pre-personalization stage includes a step S710 of connecting the battery 112 to the remainder of the circuit 110 including the clock 120.

The circuit 110, including the microprocessor 116, the memory 118, the battery 112, and the clock 120, is then positioned (step S720) in the cavity 204 in the first layer 202 of the card body 200.

In a step S730, resin 206 is then injected into the cavity 204. The resin 206 is then spread uniformly (step S740), e.g. by passing the first layer 202 of the card body 200 between two rollers, and it is then dried (step S750), e.g. by means of an ultraviolet ray emitter, so as to secure the circuit 110 in the cavity 204.

In a variant, the steps S720, S730, S740, and S750 are not performed and the circuit 110 is secured to the card body 200 in some other way.

The method may also include a step of inserting the module 212 in the card body 200.

After the pre-personalization stage P700, the method of fabrication includes a stage P760 of personalizing the smart card 100.

The personalization stage may include a step S770 of cold or hot lamination of the first layer 202, possibly laminating it with the second layer 208 and the third layer 210.

The step S310 of storing the first time data T1 may be performed after the step S710 of connecting the battery and before the step S720 of positioning the circuit. The steps S300 and S505 may also be performed between the steps S710 and S310.

In a variant, the step S310 of storing the first time data T1 may be performed after the drying step S750 and before the rolling step S770. The steps S300 and S405 may also be performed between the steps S750 and S310.

In a variant, the step S310 of storing the first time data T1 may be performed after the lamination step S770. The steps S300 and 505 may also be performed between the steps S770 and S310.

The personalization stage may also include a step S780 of software personalization and/or a step S790 of hardware personalization, e.g. by printing on and/or embossing the card body 200.

The steps S320, S330, S340, S350, S555, and/or S560 may be performed during the personalization stage.

Since the second time data T2 is read contactlessly in the calibration method, it is possible to perform this step at any time, even when the circuit 110 is no longer physically accessible, after it has been positioned inside the card body 200, thereby providing the method of fabricating the smart card 100 with great flexibility.

The invention claimed is:

1. A calibration method for calibrating a clock of a circuit for a smart card, the method comprising:
    at a first instant, storing first time data from a terminal in one or more time registers of the clock by means of a communications channel between said terminal and the circuit including the clock;
    at a second instant, reading second time data from the clock and corresponding to the first time data incremented by the clock as a function of a first duration between the first instant and the second instant;
    incrementing, by the terminal or a remote server, the first time data as a function of the first duration between the first instant and the second instant to generate third time data;
    comparing the second time data with the third time data;
    as a function of the result of the comparison, calculating first calibration data; and
    storing the first calibration data in at least one calibration register of the clock by means of the communications channel;
    wherein the second time data is read in a contactless manner by means of the communications channel.

2. A calibration method according to claim 1, wherein the first duration between the first instant and the second instant is greater than or equal to three days.

3. A calibration method according to claim 1, wherein the first time data corresponds to the current date and time of the terminal at the first instant.

4. A calibration method according to claim 1, wherein the clock comprises an oscillator and a treatment circuit including the one or more time registers and the at least one calibration register.

5. A calibration method according to claim 4, wherein the oscillator is a low frequency crystal oscillator.

6. A calibration method according to claim 1, further comprising zeroing the at least one calibration register before the first instant or at the first instant.

7. A calibration method according to claim 1, wherein storing the first time data and storing the first calibration data is performed at least in part via contactless writing.

8. A calibration method according to claim 1, wherein comparing the second time data with the third time data comprises a substep of subtracting the third time data from the second time data and a substep of dividing the result of the subtraction by the first duration between the first instant and the second instant.

9. A calibration method according to claim 1, wherein calculating the first calibration data comprises:
    a substep of calculating the drift of the clock in hertz;
    a substep of calculating the real resonant frequency of the clock as a function of the drift of the clock in hertz and as a function of the resonant frequency of the clock; and
    a substep of obtaining the first calibration data as a function of the real resonant frequency.

10. A calibration method according to claim 1, further comprising storing, in the clock, fourth time data obtained by the terminal at a third instant corresponding to the first time data incremented as a function of a second duration between the first instant and the third instant.

11. A calibration method according to claim 1, further comprising creating the communications channel between the terminal and the circuit including the clock.

12. A calibration method according to claim 11, wherein access to the communications channel requires access authentication.

13. A calibration method according to claim 12, wherein the access authentication is performed by means of a password.

14. A calibration method according to claim 12, wherein the access authentication is performed by means of public keys or private keys.

15. A calibration method according to claim 1, wherein the steps of reading second time data, of comparing the second time data with third time data, of calculating first calibration data, and of storing the first calibration data are reiterated.

16. A calibration method according to claim 1, further comprising blocking communication between the circuit including the clock and terminals external to the smart card.

17. A calibration method according to claim 1, wherein storing the first time data is performed during a pre-personalization stage while fabricating the smart card.

18. A calibration method according to claim 1, wherein the step of reading the second time data, the step of comparing the second time data with the third time data, the step of calculating first calibration data, and the step of storing the first calibration data are performed during a personalization stage while fabricating the smart card.

19. A calibration method according to claim 10, wherein storing the fourth time data in the clock is performed during a personalization stage while fabricating the smart card.

20. A calibration method according to claim 1, wherein said method is applied to the circuit including a clock, the smart card further includes a module, and said circuit including a clock is separate from and independent of the module.

21. A calibration system adapted to perform a method of calibrating a clock of a circuit for a smart card, the method comprising:
    at a first instant, storing first time data from a terminal in one or more time registers of the clock by means of a communications channel between the terminal and the circuit;
    at a second instant, reading second time data from the clock and corresponding to the first time data incremented by the clock as a function of a first duration between the first instant and the second instant;
    incrementing, by the terminal or a remote server, the first time data as a function of the first duration between the first instant and the second instant to generate third time data;
    comparing the second time data with the third time data;
    as a function of the result of the comparison, calculating first calibration data; and
    storing the first calibration data in at least one calibration register of the clock by means of the communications channel;
    wherein the second time data is read in a contactless manner by means of the communications channel.

22. A non-transitory data medium readable by a terminal of a calibration system and storing a computer program including instructions that when executed by a processor perform operations for calibrating a clock of a circuit for a smart card, the operation comprising:

at a first instant, storing first time data from the terminal in one or more time registers of the clock by means of a communications channel between the terminal and the circuit including the clock;

at a second instant, reading second time data from the clock and corresponding to the first time data incremented by the clock as a function of a first duration between the first instant and the second instant;

incrementing, by the terminal or a remote server, the first time data as a function of the first duration between the first instant and the second instant to generate third time data;

comparing the second time data with the third time data;

as a function of the result of the comparison, calculating first calibration data; and storing the first calibration data in at least one calibration register of the clock by means of the communications channel;

wherein the second time data is read in a contactless manner by means of the communications channel.

* * * * *